(12) United States Patent
Wilson et al.

(10) Patent No.: US 8,312,988 B2
(45) Date of Patent: Nov. 20, 2012

(54) SLOPED CAROUSEL BAGGAGE CONVEYOR

(75) Inventors: William H. Wilson, Nesbit, MS (US); Thomas M. Phillips, Collierville, TN (US)

(73) Assignee: Diversified Conveyors, Inc., Memphis, TN (US)

( * ) Notice: Subject to any disclaimer, the term of this patent is extended or adjusted under 35 U.S.C. 154(b) by 163 days.

(21) Appl. No.: 12/963,060

(22) Filed: Dec. 8, 2010

(65) Prior Publication Data

US 2012/0145519 A1   Jun. 14, 2012

(51) Int. Cl.
*B65G 23/14* (2006.01)
(52) U.S. Cl. .................. 198/833; 198/832; 198/850
(58) Field of Classification Search .................. 198/831, 198/502.1, 835, 833, 832, 850–853
See application file for complete search history.

(56) References Cited

U.S. PATENT DOCUMENTS

| | | | | |
|---|---|---|---|---|
| 3,554,360 A | * | 1/1971 | Bildsoe | 198/833 |
| 3,718,249 A | * | 2/1973 | Hess | 198/822 |
| 3,777,877 A | * | 12/1973 | Piper | 198/833 |
| 3,854,574 A | * | 12/1974 | Theijsmeijer et al. | 198/834 |
| 3,881,592 A | * | 5/1975 | Stimpson | 198/833 |
| 3,893,564 A | * | 7/1975 | Raynor et al. | 198/833 |
| 4,476,974 A | | 10/1984 | Bradbury | |
| 4,650,066 A | * | 3/1987 | Bradbury | 198/832 |
| 5,201,407 A | | 4/1993 | Proske | |
| 5,394,978 A | * | 3/1995 | Majewski et al. | 198/833 |
| 5,427,227 A | | 6/1995 | Crandall et al. | |
| 6,186,314 B1 | * | 2/2001 | Conklin, Jr. | 198/502.1 |
| 6,315,101 B1 | | 11/2001 | Hugon | |
| 7,621,392 B2 | | 11/2009 | Langsdorf et al. | |

* cited by examiner

*Primary Examiner* — James R Bidwell
(74) *Attorney, Agent, or Firm* — Maginot, Moore & Beck, LLP

(57) ABSTRACT

A luggage conveyor system includes a frame, a plurality of pallets movably supported by the frame each having a load carrying surface configured to convey luggage thereon, and a drive assembly. The drive assembly includes a chain formed by a plurality of chain links connected to each other. At least one chain link of the plurality of chain links is coupled to one of the plurality of pallets. The drive assembly further includes a motor-driven drive wheel, and a plurality of driven wheels coupled to and driven by the drive wheel. The plurality of driven wheels are arranged such that at least two of the driven wheels simultaneously contact the same one of the plurality of chain links to frictionally drive the chain.

15 Claims, 11 Drawing Sheets

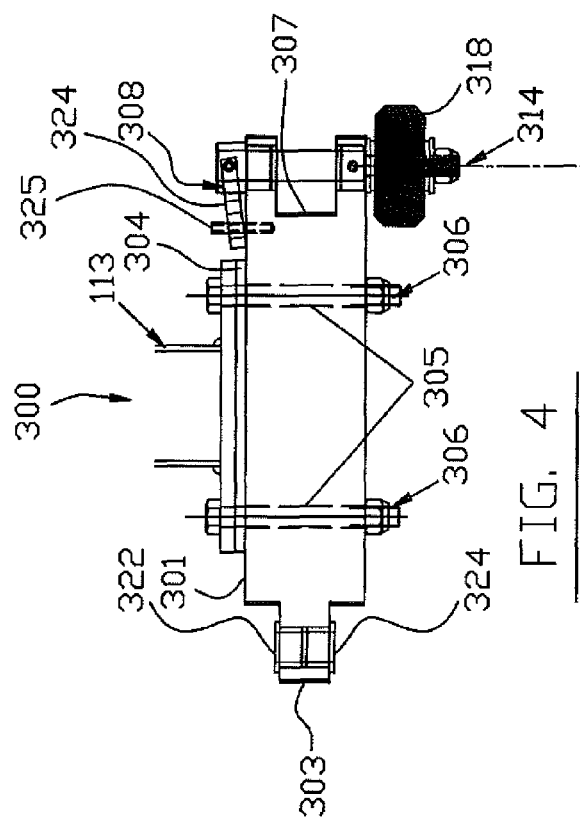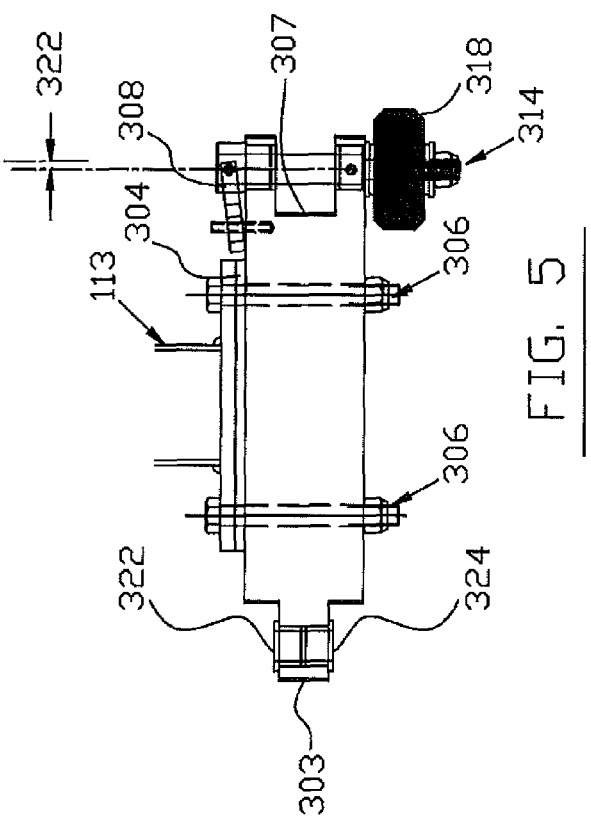

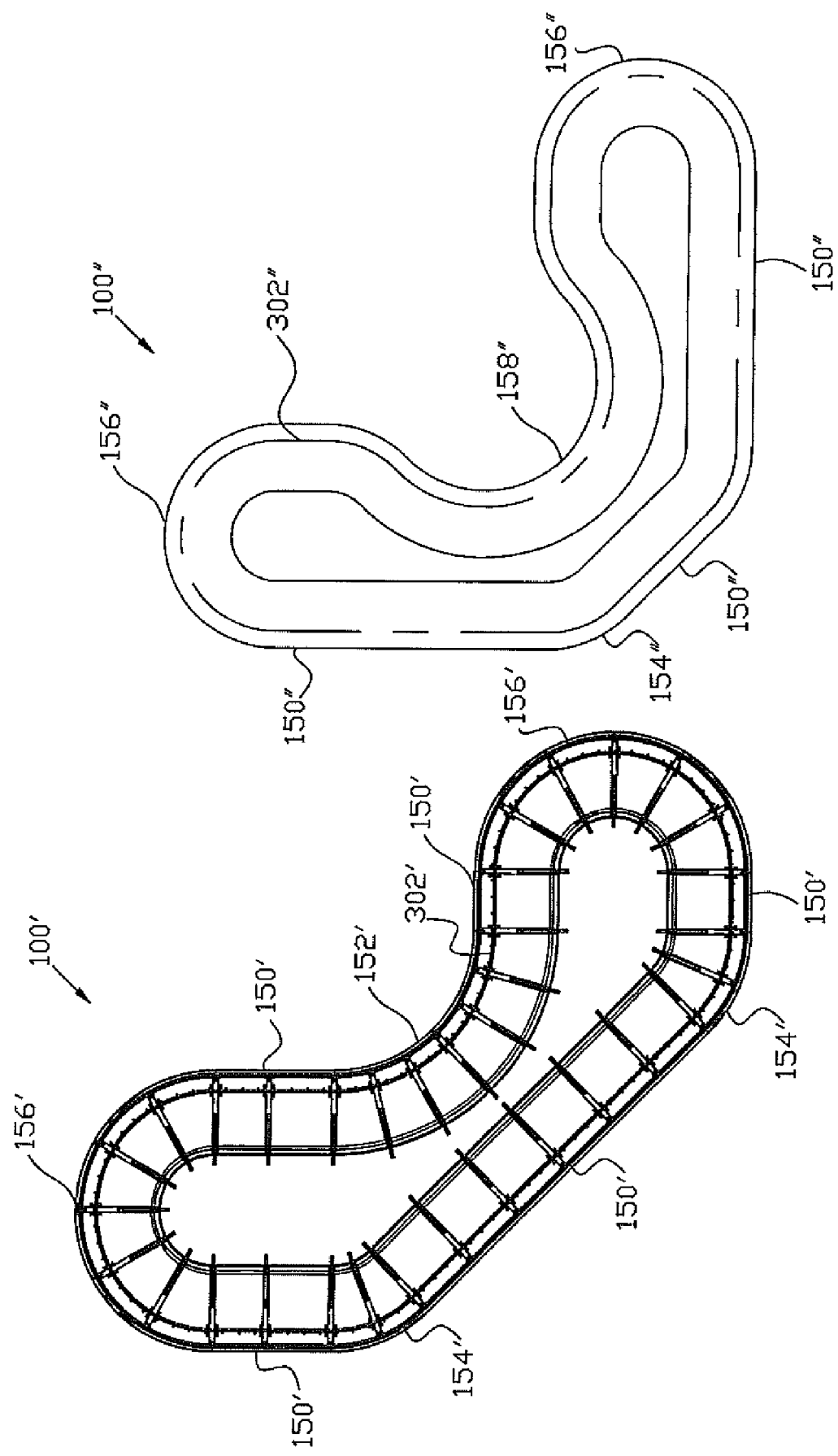

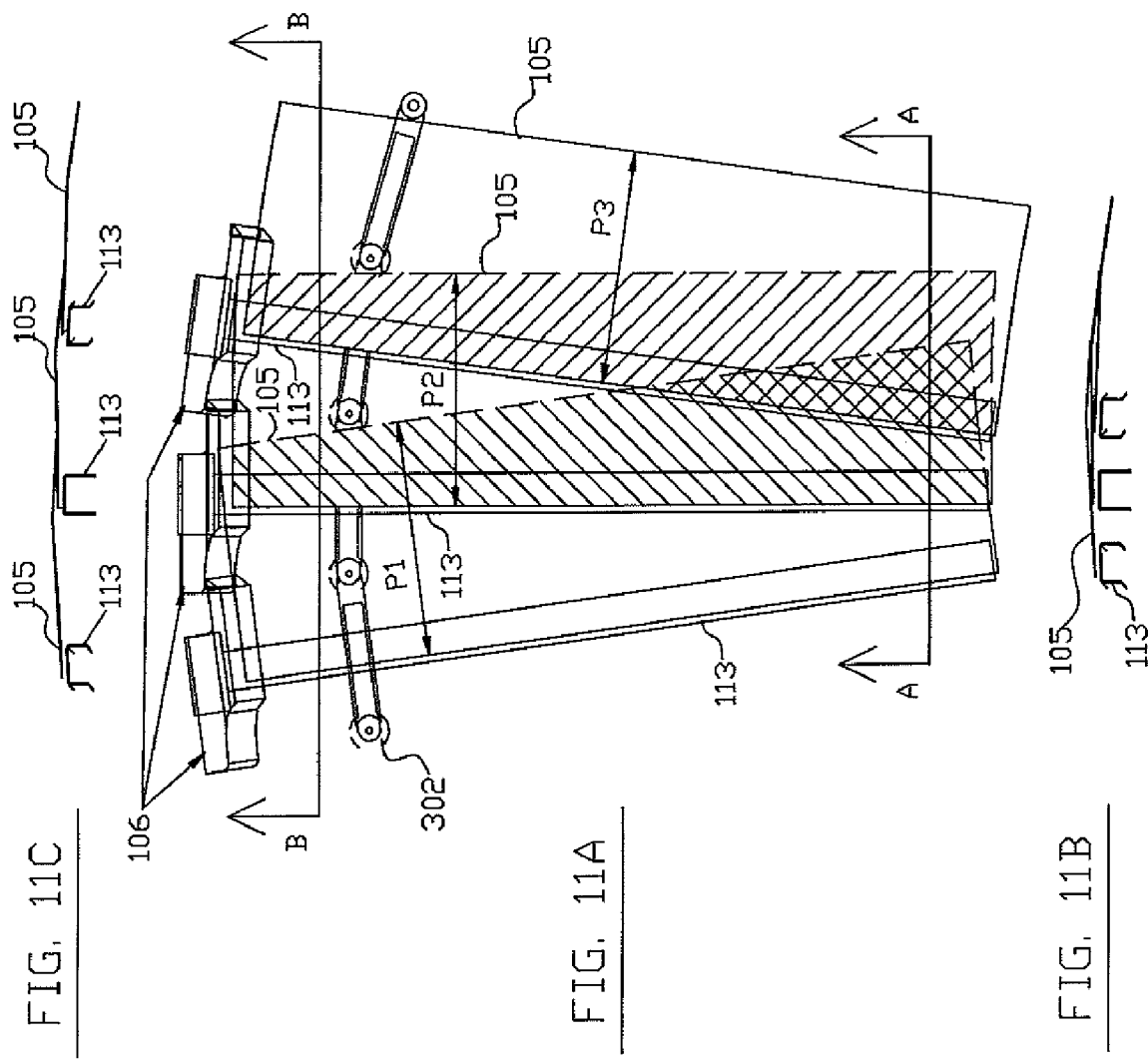

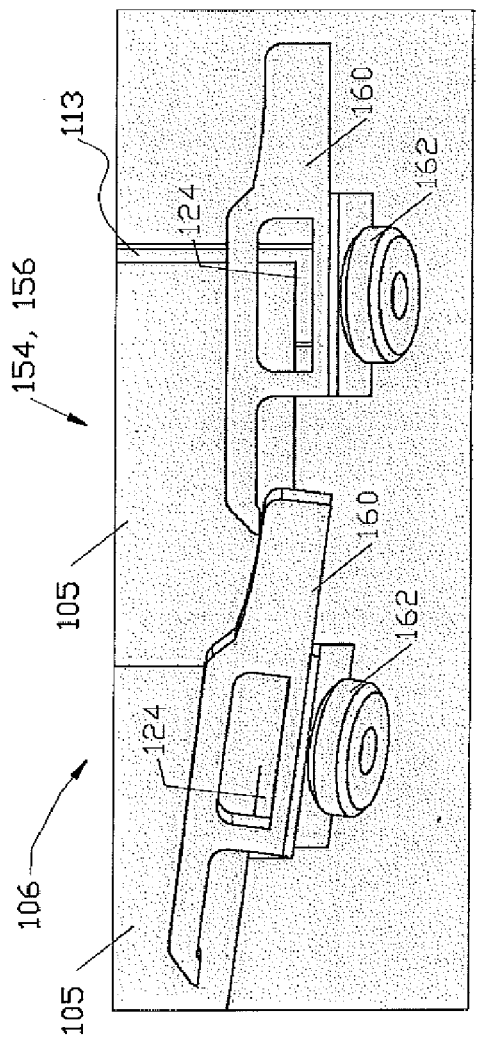
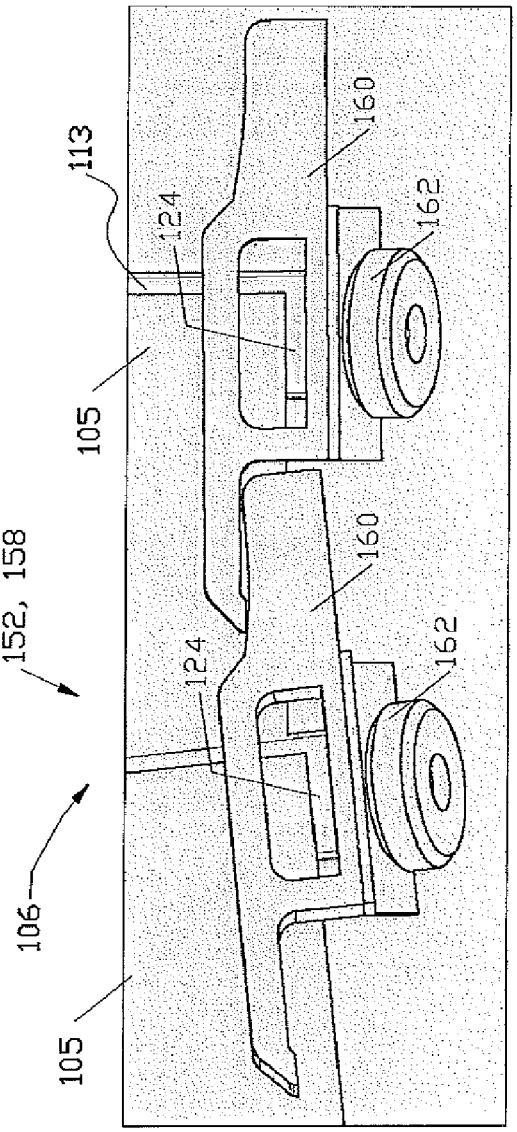

SLOPED CAROUSEL BAGGAGE CONVEYOR

BACKGROUND

The present invention relates to baggage conveyor systems, such for use in a transportation terminal. More particularly the invention concerns drive mechanisms and configurations for facilitating various radii of the drive mechanisms.

In most airports, particularly high traffic facilities, baggage handling involves an extensive array of conveyors that carry luggage, packages, and other items, hereinafter collectively referred to as luggage, from various sources to various destinations throughout the airport, including luggage carousels for incoming luggage. A typical incoming luggage system includes a conveyor for transferring incoming luggage from an airplane to a conveyor surface of the carousel.

The carousel typically has an oval shape and includes overlapping pallets that move luggage around the oval shape, with each pallet traveling a complete revolution around the oval. The pallets are driven by a drive mechanism that may be a central mechanism or a modular mechanism. An example of a modular drive mechanism is provided in U.S. Pat. No. 7,621,392 to Langsdorf et al., where a motor rotates a drive wheel that is configured to come in contact with a drive chain connected to pallets in order to move the drive chain and thereby the pallets.

However, there is an interrelationship between load carrying capability of the drive chain (measured in lbs), and the frictional engagement between the drive wheel and the drive chain (measured in lbs) including a friction factor. The friction factor is in part based on material selections for the drive wheel and for the drive chain. For example, if the drive mechanism is designed and dimensioned to move 1500 lbs, with a friction factor of 0.5, the wheel must be capable of driving 3000 lbs (1500/0.5=3000). However, a single drive wheel capable of driving 3000 lb with a 0.5 friction factor may be expensive, noisy, and wear quickly. It is desirable for the drive mechanism to drive a large load, e.g., 1500 lbs, quietly and without excessive wear.

Once luggage makes contact with the conveying surface of the carousel, it continues to travel around the carousel until the luggage is picked by a person. The luggage capacity of the usual oval-shaped carousel is limited by the length of its perimeter. Therefore, airport terminals are designed to provide sufficiently large perimeters for the oval carousels to accommodate a large number of passengers. It may be desirable to provide a carousel with varying non-oval shapes, including inside and outside turns, in order to accommodate a large number of passengers in a terminal.

Therefore, it is desirable to provide improvements in carousel designs to meet challenges faced in an airport terminal.

SUMMARY

In accordance with one aspect, a luggage conveyor system is provided. The luggage conveyor system includes a frame, a plurality of pallets movably supported by the frame each having a load carrying surface configured to convey luggage thereon, and a drive assembly. The drive assembly includes a chain formed by a plurality of chain links connected to each other. At least one chain link of the plurality of chain links is coupled to one of the plurality of pallets. The drive assembly further includes a motor-driven drive wheel, and a plurality of driven wheels coupled to and driven by the drive wheel. The plurality of driven wheels are arranged such that at least two of the driven wheels simultaneously contact the same one of the plurality of chain links to frictionally drive the chain.

In accordance with another aspect, a luggage conveyor system is provided. The luggage conveyor system includes a plurality of pallets configured to convey luggage, a drive mechanism, and a chain coupled between the drive mechanism and the plurality of pallets to move the pallets. The chain is formed by a plurality of chain links connected to each other. The chain is movably coupled to the drive mechanism. At least one chain link is configured to adjust the length thereof while the chain is coupled to the drive mechanism and the at least one chain link is contiguous with the chain.

In accordance with yet another aspect, a luggage conveyor system is disclosed. The luggage conveyor system includes a frame having a length which includes at least one linear section, at least one inside turn and at least one outside turn. The luggage conveyor system further includes a plurality of pallets movably supported by the frame. Each pallet has a first end, a second end, and a load conveying surface between the first end and the second end configured to carry luggage thereon. The luggage conveyor system further includes a drive assembly coupled to the plurality of pallets to move the pallets relative to the frame, and a plurality of bumpers. Each bumper coupled to a corresponding one of the plurality of pallets at the second end of the pallet. The plurality of bumpers are configured to overlap each other to provide a substantially continuous surface as the plurality of pallets move along the frame, the surface projecting upward from the load conveying surface to abut luggage.

DESCRIPTION OF THE FIGURES

FIG. 4 is an elevation view of a chain link shown in FIG. 2, depicted in a first position.

FIG. 5 is an elevation view of a chain link shown in FIG. 2, depicted in a second position.

FIG. 8 is a top view of a luggage transfer conveyor system, according to another embodiment of the present disclosure.

FIG. 9 is a top view of a luggage transfer conveyor system, according to another embodiment of the present disclosure.

FIG. 11A is a top view of three pallets positioned in an outside turn section of the luggage transfer conveyor system shown in FIGS. 1, 8, and 9.

FIG. 11B is a fragmentary cross sectional view of a section shown in FIG. 11A.

FIG. 11C is a fragmentary cross sectional view of another section shown in FIG. 11A.

FIG. 14 is a top view of two bumpers, each coupled to a pallet assembly, for an outside turn that can be used in the luggage transfer conveyor system shown in FIG. 8.

FIG. 15 is a top view of two bumpers each coupled to a pallet assembly, for an inside turn that can be used in the luggage transfer conveyor system shown in FIG. 8.

DETAILED DESCRIPTION

Figure 1:
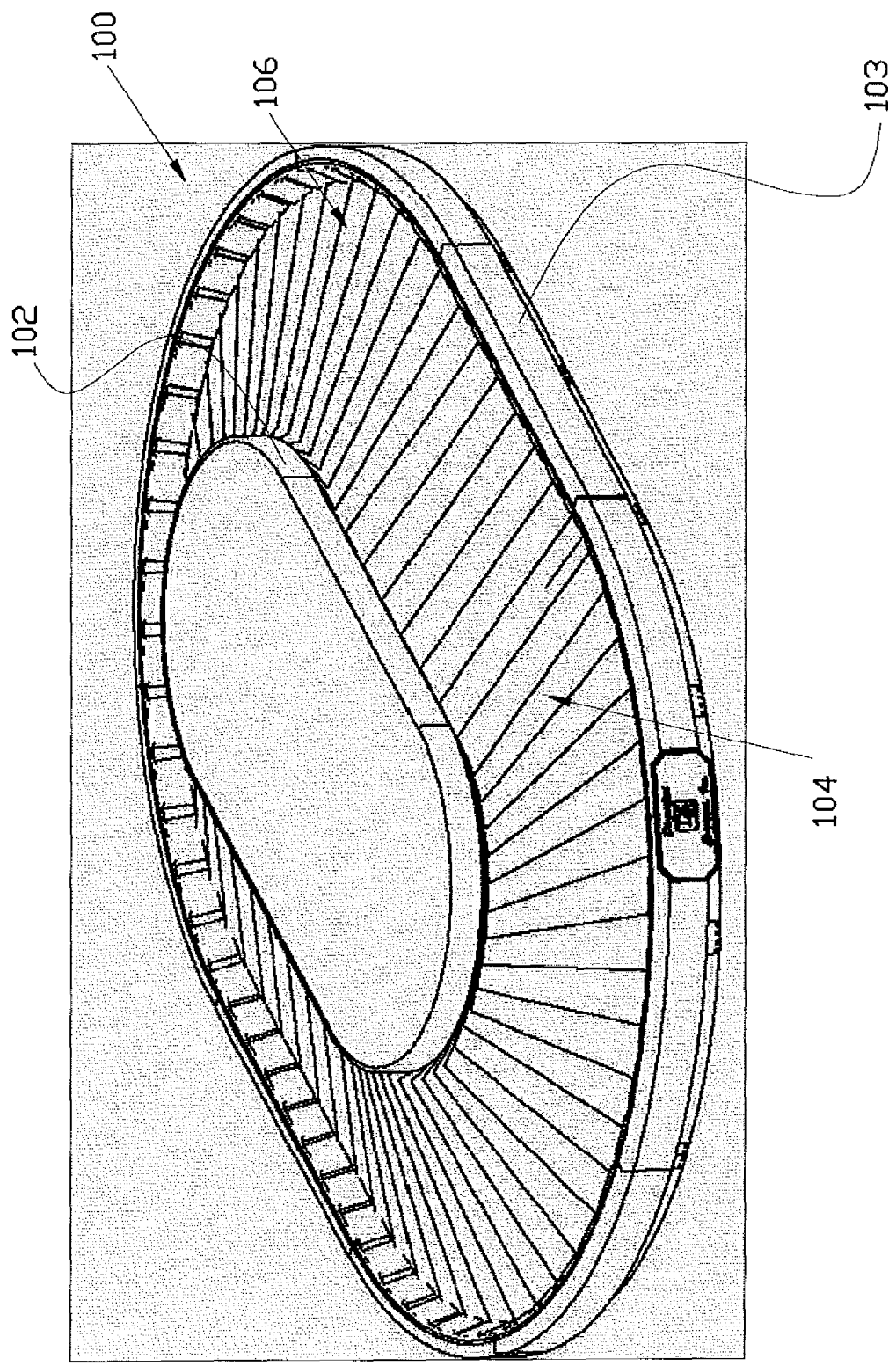
FIG. 1 is a plan view of an oval-shaped luggage transfer conveyor system including a cutout depicting a drive mechanism, a plurality of pallet assemblies, and a cutout depicting a chain, according to one embodiment of the present disclosure.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

In accordance with one aspect, the present disclosure contemplates a luggage conveyor system 100, as shown in FIG. 1. The system 100 in this embodiment is oval shaped, although other configurations are contemplated as described herein. The system includes an upper frame 102, a lower frame 103, and a plurality of pallet assemblies 104 supported by and extended between the upper frame 102 and the lower frame 103. Each pallet assembly 104 is terminated with a corresponding moving bumper assembly 106 adjacent the lower frame 103.

Figure 2:
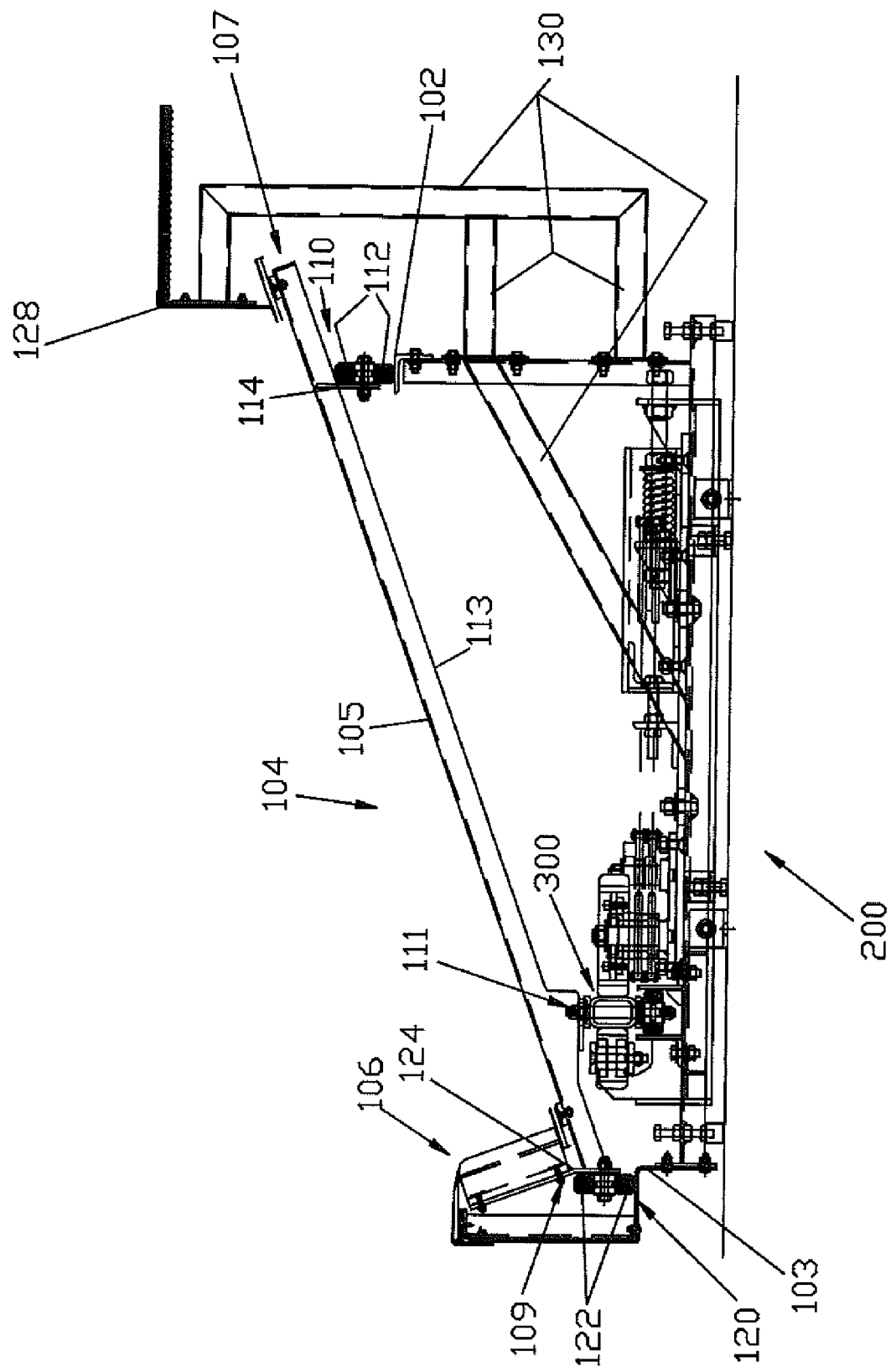
FIG. 2 is a fragmentary cross sectional view of a section of the luggage transfer conveyor system of FIG. 1, depicting a pallet assembly coupled to a chain link that is driven by a drive mechanism.

FIG. 2 is a fragmentary cross sectional view of the luggage conveyor system 100 showing one of the plurality of pallet assemblies 104. Depicted in FIG. 2 are a drive mechanism 200 and a chain 302 that drive the pallet assemblies 104. The chain 302 is proximate the lower frame 103 and extends around the circumference of the conveyor system 100, operably parallel to the lower frame 103. The chain 302 includes a plurality of chain link assemblies 300 with each pallet assembly 104 connected to a particular chain link assembly 300, as will be described in greater detail below. The chain 302 is coupled to and driven by the drive mechanism 200.

The pallet assembly 104 includes a pallet plate 105, an upper roller assembly 110, a lower roller assembly 120, and a pallet beam 113. The upper roller assembly 110 includes upper roller's 112 and an upper roller bracket 114 connected to the pallet beam 113 proximate an upper end 107 of the pallet plate 105. The upper roller bracket 114 carries the upper rollers 112 that rest on, and are movable along, the upper frame 102 to provide support for the upper roller assembly 110 and the pallet plate 105. Each pallet plate 105 is connected to a pallet beam 113 at one side of the pallet plate 105, in a cantilever manner, as further described below with reference to FIGS. 10A, and 10B. Similarly, the lower roller assembly 120 includes lower rollers 122 and a lower roller bracket 124 connected to the pallet beam 113 proximate a lower end 109 of the pallet plate 105.

The pallet beam 113 is terminated at the lower end 109 with the bumper assembly 106. The bumpers assembly 106, described in greater detail below, may be coupled to a portion of the lower roller bracket 124. The pallet beam 113 is terminated at the upper end 107 with an upper guard 128 mounted to braces 130 by a bearing plate in sliding contact with end 107 of the pallet plates 105. The upper frame 102 and the lower frame 103 orient the pallet beam 113 to have an angular relationship with respect to the lower frame 103, e.g., 20 degrees.

Figure 3:
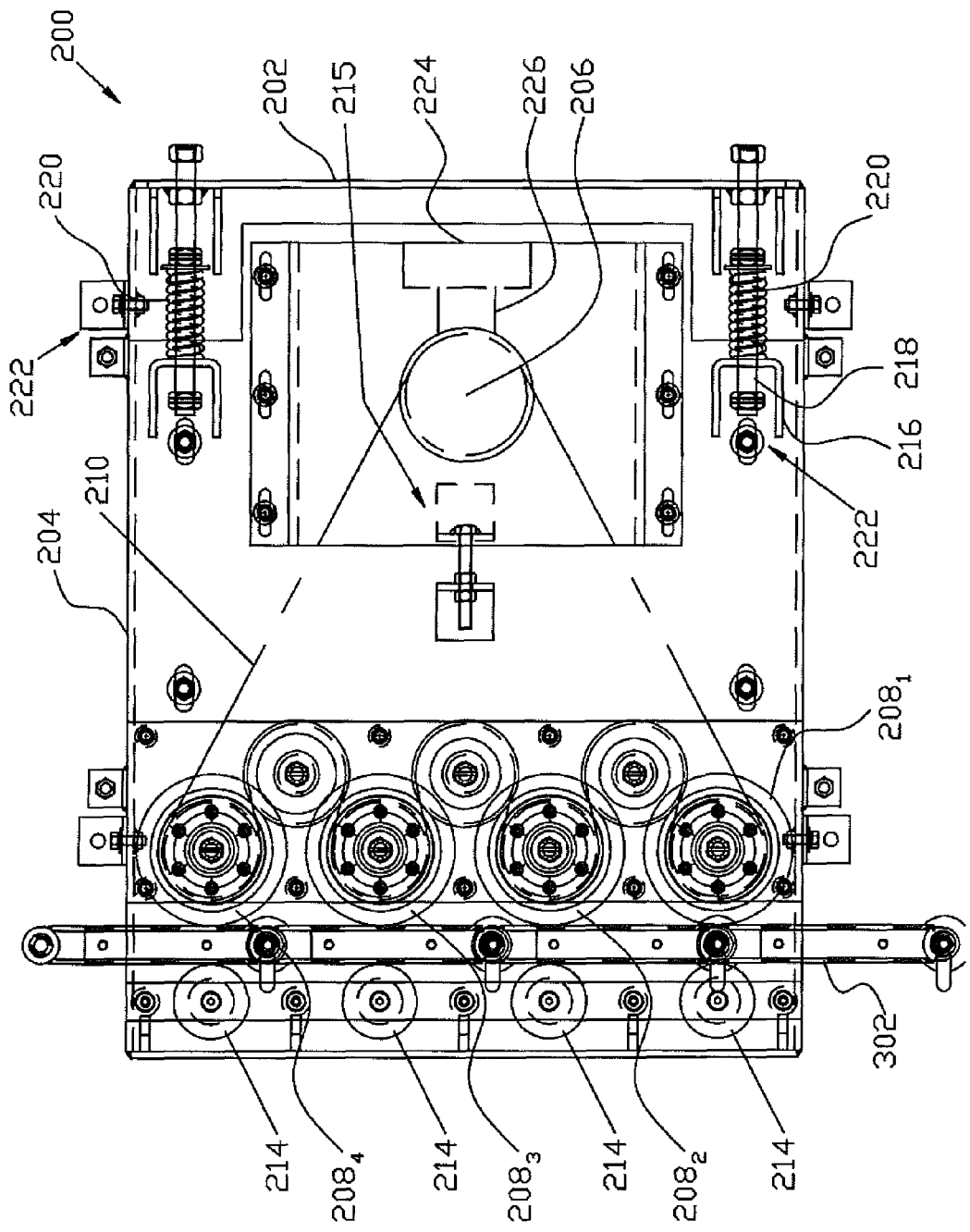
FIG. 3 is a top view of the drive mechanism shown in FIG. 2.

FIG. 3 is a top view of a drive mechanism 200 in greater detail. In one embodiment a number of drive mechanism 200 are provided about the luggage conveyor system 100. For instance, the drive mechanism 200 may be uniformly distributed around the conveyor system 100, shown in FIG. 1. Preferably, a drive mechanism 200 is provided every three feet of length of the conveyor to provide optimum drive capability. The drive mechanism 200 includes a fixed frame 202, that is fixedly attached to the lower frame 103 (connection not shown) or is a part of the lower frame 103, and a floating frame 204. The floating frame 204 provides support for various components of the drive mechanism 200 that are used to drive a plurality of driven wheels $208_n$ (where n=1, 2, 3, or 4). For instance, the floating frame 204 supports a motor 224, a drive member 226, a drive wheel 206, the plurality of driven wheels $208_n$, and idler wheels 212. The motor 224 is coupled to the drive wheel 206 by the drive member 226 and causes rotation of the drive wheel 206 which causes rotation of driven wheels $208_n$ and the idler wheels 212 by coupling to these wheels with the flexible linkage 210. The floating frame 204 is adjustably coupled to the fixed frame 202 by a tension adjustment assembly 222 which includes tension brackets 216 connected to the floating frame 204, tension adjusters 218 threadedly connecting the fixed frame 202 and the floating frame 204, and springs 220 to bias the floating frame 204 away from the fixed frame 202.

The flexible linkage 210 may be a chain or a belt. For the purpose of interfacing, the drive wheel 206, the driven wheels $208_n$, and the idler wheels 212 each have an associated sprocket interface that couples with the flexible linkage 210. Each sprocket interface may include a single sprocket or a double sprocket.

The biasing forces of the springs 220 bias the driven wheels 208 toward backup rollers 214 to frictionally engage the chain 302, disposed therebetween. The backup rollers 214 are fixedly coupled to the fixed frame 202.

As discussed above, four driven wheels 208 are depicted in the embodiment of the drive mechanism 200 in FIG. 3. It should be appreciated that more than one driven wheel reduces frictional engagement requirement of the driven wheel with the chain 302 as a result of load sharing. Referring to the example provide in the background of the present disclosure, if a drive mechanism is designed and dimensioned to move 1500 lbs, with a friction factor of 0.5, the wheel of a single-wheel drive mechanism must be capable of driving 3000 lbs (1500/0.5=3000). However, as a result of load sharing, each of the four wheels of the embodiment depicted in FIG. 3, only has to be capable of driving 750 lbs (1500/0.5/4=750), based on the same friction factor. The lower drive requirement for each wheel may result in less wear of each wheel which may results in a layer of material deposited on the chain 302 which can also result in clogging of the chain.

FIGS. 4 and 5 are elevation views of the chain link assembly 300 in different positions. The chain link assembly 300 includes a link body 301. The link body includes a tongue portion 303 and a groove portion 307. The tongue portion 303 is configured to fit within the groove portion 307 and be secured therein. A link plate 304 is connected to the link body 301 by fastener assemblies 306, (i.e., bolts and nuts). The link plate 304 includes holes which are aligned with through-holes 305 provided in the link body 301. The bolts of the fastener assemblies 306 extend through holes provided in the pallet beam 113 at the pallet-chain interface 111 (see FIG. 2), and further extend through the link plate 304 and through-holes 305, in order to securely connect the pallet beam 113 to the chain link assembly 300.

The tongue portion 303 has a through hole which is configured to receive a pin 309 of an adjustable roller fastener 314. The adjustable roller fastener 314 includes an eccentric bolt and nut assembly 308 to provide adjustability of position with respect to the link body 301. The adjustable roller fastener 314 is also coupled to the link body 301 by a linkage 324 and a fastener 325 which extends through a slotted hole in the linkage 324 and threadedly engages the link body 301.

The eccentric bolt and nut assembly 308 and the adjustable roller fastener 314 are configured to adjust spacing between one chain link assembly 300 and another. The eccentric bolt and a nut assembly 308 and the adjustable roller fastener 314 are depicted in a first position (FIG. 4) and a second position (FIG. 5). A centerline of the pin 309 is depicted in different positions with respect to the first and second positions, defining a spacing 322. Thereby, the chain link assembly 300 can be shortened or elongated by the spacing 322 by placing the eccentric bolt and nut assembly 308 and the adjustable roller fastener 314 in the first and second positions. Since the aforementioned adjustability of the chain link assembly 300 is independent of its coupling with the pallet beam 113, each chain link assembly 300 can be shortened or elongated while the chain 302 is extended around the luggage conveyor system 100, thereby eliminating the necessity to disassemble the chain 302 from the respective pallet assemblies 104.

The chain link assembly 300 is configured so that the length of each chain link assembly is larger than the distance between two consecutive driven wheels $208_n$ in the same drive mechanism 200. According to this relationship, at least two driven wheels 208 contact each chain link assembly 300 within the same drive mechanism 200. This relationship may result in a quieter operation and less wear on the components making up the chain link assembly.

As described above, each chain link assembly 300 is coupled to another chain link assembly by the tongue and groove portion 303 and 305 combinations. Specifically, the link roller 318 of one chain link assembly 300 couples with the tongue portion 303 of another chain link assembly and is secured in place by the adjustable roller fastener 314. The link roller 318 is configured to rotate on a track (shown in FIG. 2) to provide support for the chain link assembly 300.

Figure 7:
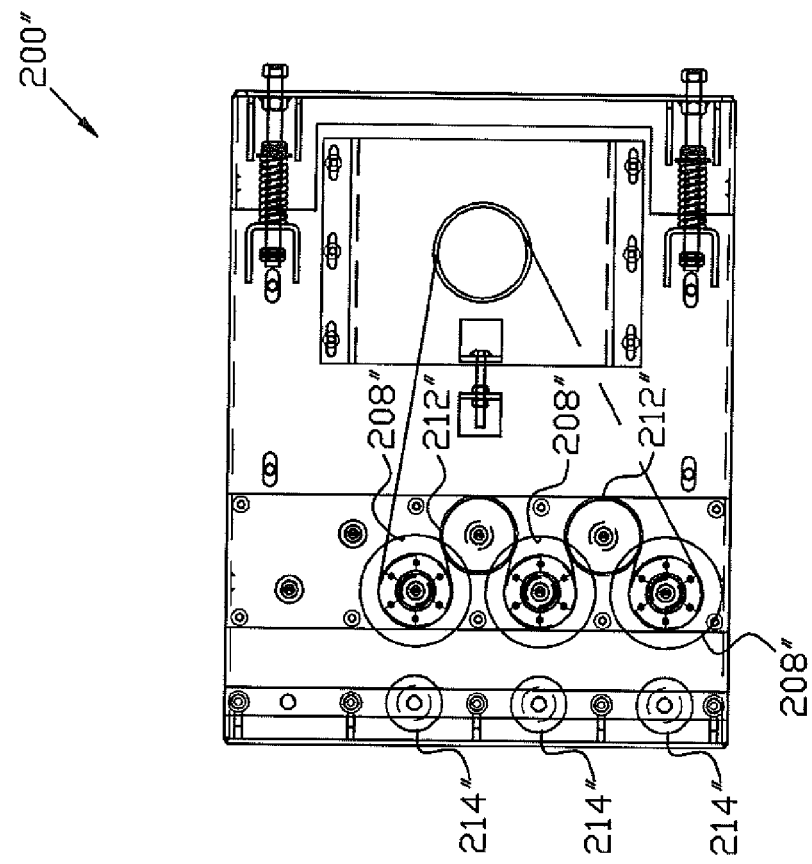
FIG. 7 is a top view of yet another embodiment of a drive mechanism that can be used in the luggage transfer conveyor system shown in FIG. 2.
Figure 6:
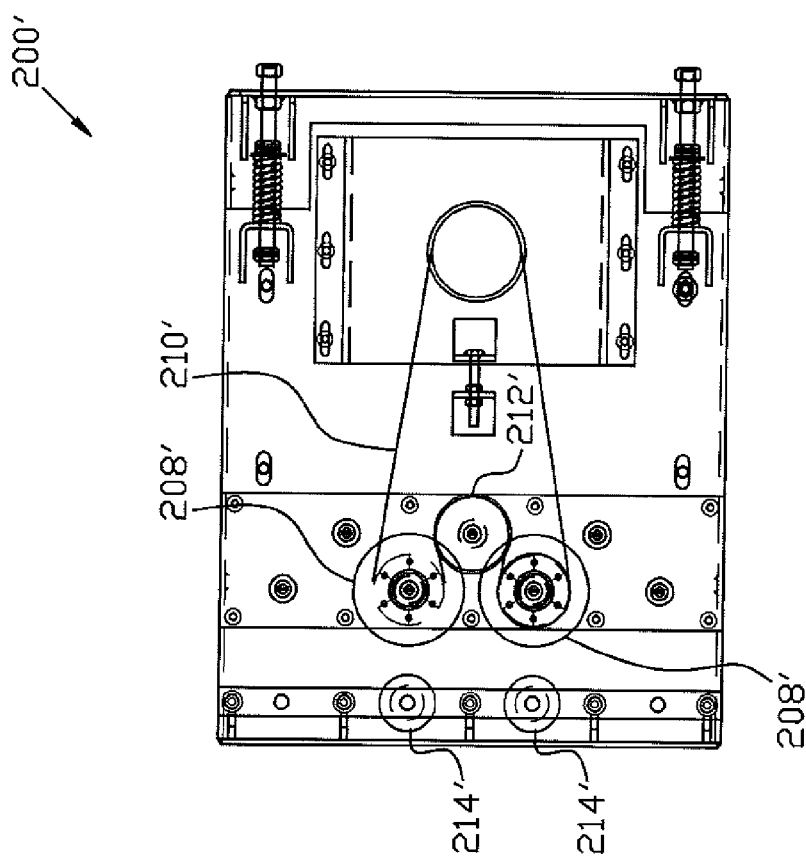
FIG. 6 is a top view of another embodiment of a drive mechanism that can be used in the luggage transfer conveyor system shown in FIG. 2.

FIGS. 6 and 7 are top views of alternative embodiments for the drive mechanism 200, thereby identified as 200' and 200". In the embodiment of FIG. 6, two driven wheels $208_1'$ and $208_2'$ are used with one idler wheel 212' and two backup rollers 214'. The flexible linkage 210' couples the driven wheels $208_1'$ and $208_2'$ with the idler wheel 212'. In the embodiment of FIG. 7, three driven wheels $208_1"$, $208_2"$, and $208_3"$ are used with two idler wheel 212" and three backup rollers 214". The flexible linkage 210" couples the driven wheels $208_1"$, $208_2"$, and $208_3"$ with the idler wheels 212". The particular drive mechanism, i.e., 200, 200', or 200", that is used in a luggage conveyor application may depend on several factors including but not limited to the loading requirement of objects that the conveyor is designed to convey, the construction and size of the driven wheels, and the size and construction of the chain link assembly.

As discussed above, while the luggage conveyor system 100 depicted in FIG. 1 is oval shaped, the reader should appreciate that other non-oval shapes may also be implemented. FIGS. 8 and 9 are top views of other non-oval shaped embodiments for the luggage conveyor system, identified as 100' and 100". In FIG. 8, the luggage conveyor system 100' includes linear sections 150', a section including a partial inside turn 152', sections including partial outside turns 154', and sections including complete outside turns 156'. The chain 302' is disposed near the outside perimeter. In FIG. 9, the luggage conveyor system 100" includes linear sections 150", sections including partial outside turns 154", sections including complete outside turns 156", and one section including a complete inside turn 158". The chain 302" is disposed near the outside perimeter.

Figures 10A, 10B:
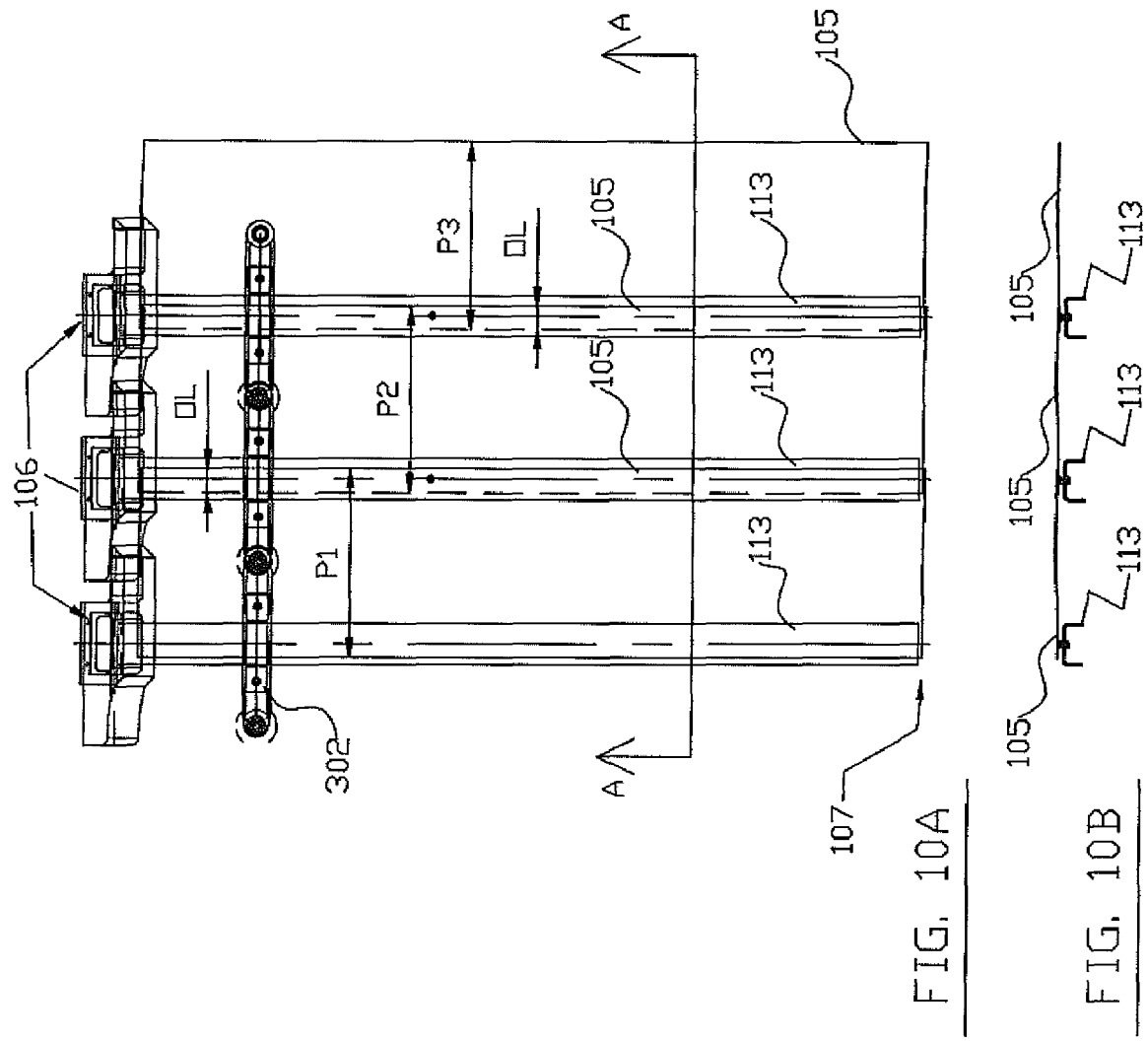
FIG. 10A is a top view of three pallets positioned in a linear section of the luggage transfer conveyor system shown in FIGS. 8, and 9.
FIG. 10B is a fragmentary cross sectional view of a section shown in FIG. 10A.

FIG. 10A is a top view of three consecutive pallet plates 105 connected to three pallet beams 113 and three bumper assemblies 106 oriented in a linear section 150' or 150" as depicted in FIGS. 8 and 9, respectively. Also depicted is the chain 302 proximate the bumper assemblies 106. The perimeters of the three pallet plates 105 are depicted with dotted lines, and the plates are identified as P1, P2, and P3. The pallet plates 105 overlap, and the overlap is depicted as the shaded areas and are identified as OL.

FIG. 10A shows the cantilever relationship between the pallet plate 105 and the pallet beam 113. The pallet plate 105 is connected to the pallet beam 113 at one side of the plate 105 and from there cantilevers out until it comes in contact with another pallet plate 105 which is supported by another pallet beam 113. This relationship is also depicted in FIG. 10B.

FIG. 10B is a fragmentary cross sectional view of the pallet plates 105 and the pallet beams 113 about a section line A-A depicted in FIG. 10A. Each pallet plate 105 overlaps another pallet plate 105. Due to the cantilever action, each pallet plate 105 deflects downward away from the pallet beam 113. The deflection has an inverse function to the distance from the pallet beam 113, as will be described in greater detail below.

FIG. 11A is three pallet plates 105 coupled to three pallet beams 113 in a partial/complete outside turn 154'/156' as depicted in FIG. 8. The perimeters of the three pallet plates 105 are depicted with dotted lines, and the plates are identified as P1, P2, and P3. The pallet plates 105 overlap, and the overlap is depicted as the shaded areas.

FIG. 11B is a fragmentary cross sectional view of the pallet plates 105 and the pallet beams 113 about a section line A-A depicted in FIG. 11A. FIG. 11C is a fragmentary cross sectional view of the pallet plates 105 and the pallet beams 113 about a section line B-B depicted in FIG. 11A. An exemplary embodiment is provided below in which relationship between deflections of pallet plates 105 as a function of distance from the pallet beams 113 is provided.

Figures 12A, 12B, 12C:
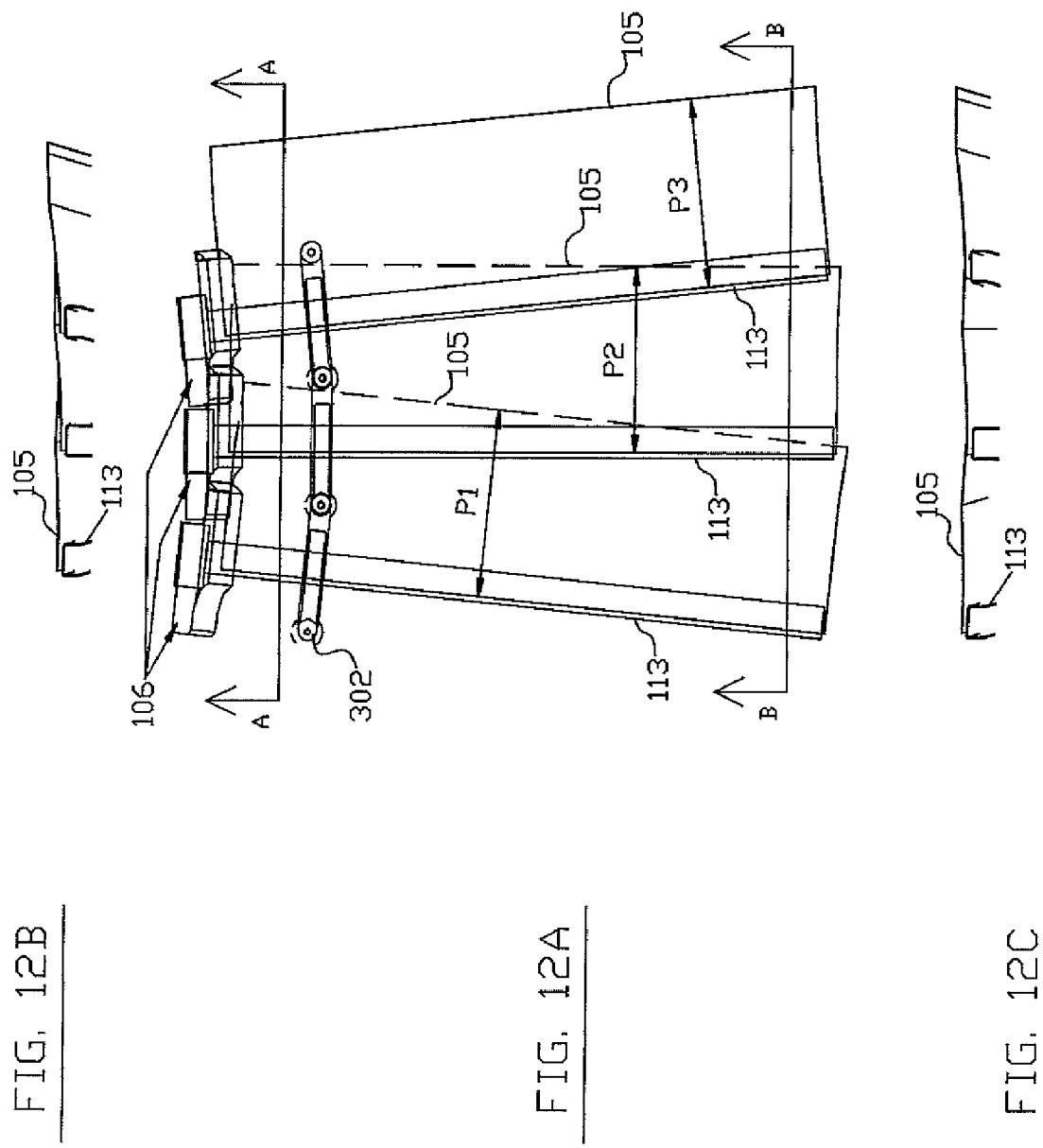
FIG. 12A is a top view of three pallets positioned in an inside turn section of the luggage transfer conveyor system shown in FIGS. 8 and 9.
FIG. 12B is a fragmentary cross sectional view of a section shown in FIG. 12A.
FIG. 12C is a fragmentary cross sectional view of another section shown in FIG. 12A.

FIG. 12A is three pallet plates 105 coupled to three pallet beams 113 in a partial/complete inside turn 152' and 158" as depicted in FIGS. 8 and 9, respectively. The perimeters of the three pallet plates 105 are depicted with dotted lines, and the plates are identified as P1, P2, and P3. The pallet plates 105 overlap, and the overlap is depicted as the shaded areas.

FIG. 12B is a fragmentary cross sectional view of the pallet plates 105 and the pallet beams 113 about a section line A-A depicted in FIG. 12A. FIG. 12C is a fragmentary cross sectional view of the pallet plates 105 and the pallet beams 113 about a section line B-B depicted in FIG. 12A. An exemplary embodiment is provided below in which relationship between deflections of pallet plates 105 as a function of distance from the pallet beams 113 is provided.

Figure 13:
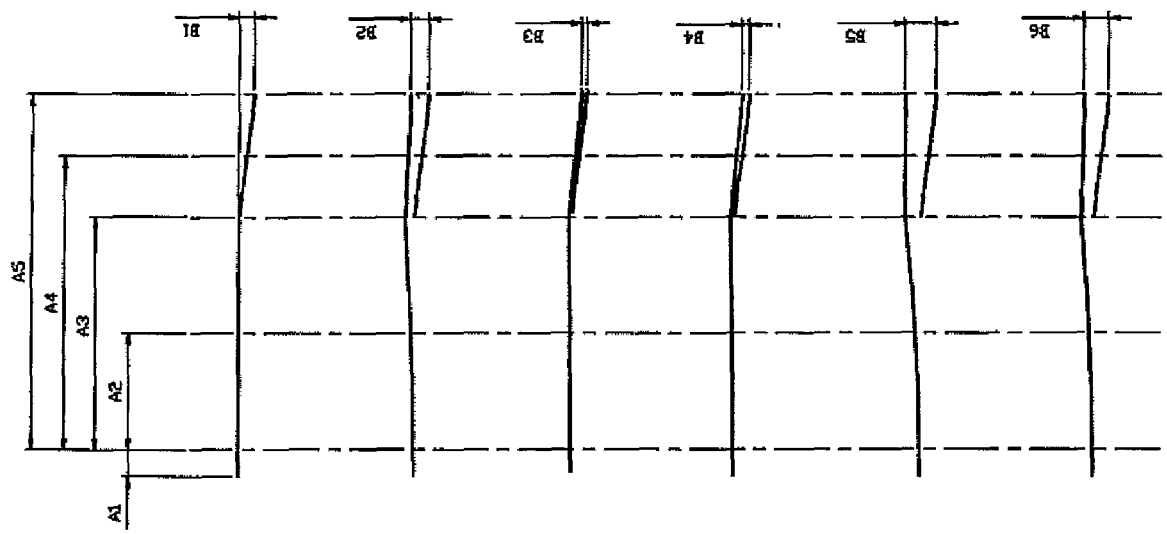
FIG. 13 is a deflection chart of pallet plate deflections shown in FIGS. 10B, 11B, 11C, 12B, and 12C.

FIG. 13 is a deflection schematic that depicts the cantilever of pallet plates 105 as a function of distance from the pallet beams 113 for different circumstances shown in FIGS. 10A, 10B, 11A, 11B, 11C, 12A, 12B, and 12C. Table 1, below, provides exemplary values for parameters identified as X1, X2, X3, X4, B1, B2, B3, B4, B5, and B6. The parameters X1, X2, X3, and X4 indicate different distances away from the edge of the palate plates 105 which is connected to the pallet beam 113. In the exemplary embodiment provided below X1, is 5.375 inches, X2 is 10.750 inches, X3 is 13.625 inches, and X4 is 16.500 inches. The maximum pallet plate width in this exemplary embodiment is 17.75 inches. The parameter B1 indicates the maximum defection of the pallet plate in a relaxed position, i.e., without interference from another pallet plate. The parameter B2 indicates the maximum deflection of the pallet plates shown in FIG. 10B relative to B1, B3 indicates the maximum deflection shown in FIG. 11C relative to B1, B4 indicates the maximum deflection shown in FIG. 11B relative to B1, B5 indicates the maximum deflection shown in FIG. 12B relative to B1, and B6 indicates the maximum deflection shown in FIG. 12C relative to B1. The maximum radius of the outside turn, shown in FIGS. 8, 9, and 11A, and the maximum radius of the inside turn, shown in FIGS. 8, 9, and 12A, is 102 inches from a center position to the outside perimeter of the luggage conveyor system 100. The maximum deflection of the pallet plates in the relaxed position is 0.705 inches. Also, the chain 302 is 15 inches from the outside perimeter.

TABLE 1

Deflections (in inches) as a function of distance from the edge (in inches) for different configurations

|  | X1 | X2 | X3 | X4 |
|---|---|---|---|---|
| DISTANCE | 5.375 | 10.750 | 13.625 | 16.500 |
| B2 | 0.125 | 0.439 | 0.652 | 0.880 |
| DISTANCE | 5.375 | 10.750 | 13.625 | 16.500 |
| B3 | 0.035 | 0.125 | 0.185 | 0.250 |
| DISTANCE | 5.375 | 10.750 | 13.625 | 16.500 |
| B4 | 0.048 | 0.169 | 0.252 | 0.340 |
| DISTANCE | 5.375 | 10.750 | 13.625 | 16.500 |
| B5 | 0.206 | 0.723 | 1.075 | 1.450 |
| DISTANCE | 5.375 | 10.750 | 13.625 | 16.500 |
| B5 | 0.163 | 0.573 | 0.852 | 1.150 |

The worst case deflection is 1.450 inches for the configuration depicted in FIG. 12B. For the exemplary configurations discussed above, a force required to generate the latter deflection is 14.5 lbs. This amount of force does not generate excessive stresses on the interface between the pallet plate 105 and the pallet beam 113.

FIGS. 14 and 15 are top views of two consecutive bumper assemblies 106 oriented about partial/complete outside turns 154/156 and partial/complete inside turns 152/158, respectively. Also depicted are the pallet beams 113 coupled to each bumper assembly 106 by the lower roller bracket 124. Each bumper assembly includes a flexible member 160 and a roller 162. The flexible member 160 is designed and dimensioned to provide a continuous surface about the perimeter of the luggage conveyor system with the pallets positioned in the partial/complete outside turns 154/156. Similarly, the flexible member 160 is designed and dimensioned to avoid interference about the perimeter of the luggage conveyor system with the pallets positioned in the partial/complete inside turns 152/158. The flexible members 160 are provided to cushion the impact of the luggage sliding from the first end 107 of the pallet plate 105 to the second end 109 of the pallet plate 105. The roller 162 is configured to make contact with the pallet plate 105 proximate the end 109. The roller 162 provides a smooth rolling action of the bumper assembly 106 as the pallet plates 105 slide with respect to one another as the pallet assemblies 104 move around the luggage conveyor system. Furthermore, the bumper assemblies may be pivotably coupled to the pallet beams 1113 by pivotably connecting to the lower roller brackets 124, to further improving the sliding ability of the bumper assemblies 106 with respect to each other. The flexible members are configured to overlap a maximum of 3.774 inches which occurs in a partial/complete inside turn as depicted in FIG. 15.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A luggage conveyor system, comprising:
  a frame;
  a plurality of pallets moveably supported by said frame each having a load carrying surface configured to convey luggage thereon; and
  a drive assembly, including:
    (i) a chain formed by a plurality of chain links connected to each other, wherein at least one chain link of said plurality of chain links is coupled to one of said plurality of pallets;
    (ii) a motor-driven drive wheel; and
    (iii) a plurality of driven wheels coupled to and driven by said drive wheel, and arranged such that at least two of said driven wheels simultaneously contact said same one of said plurality of chain links to frictionally drive said chain.

2. The luggage conveyor system of claim 1, said drive assembly further comprising at least one backup roller engaging in opposition to said at least two driven wheels.

3. The luggage conveyor system of claim 1, said drive assembly further comprising:
  (i) a floating frame with said drive wheel supported thereon; and
  (ii) a biasing member coupled between said floating frame and said frame and configured to bias said drive wheel in relation to said driven wheels.

4. The luggage conveyor system of claim 3, wherein said drive wheel is coupled to said driven wheels by a flexible member.

5. The luggage conveyor system of claim 1, said plurality of driven wheels including at least three driven wheels.

6. The luggage conveyor system of claim 1, said plurality of driven wheels including at least four driven wheels.

7. The luggage conveyor system of claim 1, wherein a first pair of said driven wheels simultaneously contact a same first one of said plurality of chain links and a second pair of said driven wheels simultaneously contact a same second one of said plurality of chain links to frictionally drive said chain.

8. A luggage conveyor system, comprising:
  a plurality of pallets configured to convey luggage;
  a drive mechanism; and
  a chain coupled between said drive mechanism and said plurality of pallets to move said pallets, said chain formed by a plurality of chain links connected to each other and moveably engaged to said drive mechanism, at least one chain link is configured to adjust the length thereof while said chain is coupled to said drive mechanism and said at least one chain link is contiguous with said chain and movably engaged to said drive mechanism.

9. The luggage conveyor system of claim 8, said at least one chain link further comprising an upper portion, a bottom portion, and a pin, said upper portion slidably coupled to said bottom portion, and configured to be fixed in place with respect to said bottom portion by said pin.

10. The luggage conveyor system of claim 8, wherein said drive mechanism is configured to form a friction drive engagement with said chain.

11. A luggage conveyor system, comprising
a frame having a length including at least one linear section, at least one inside turn and at least one outside turn;
a plurality of pallets moveably supported by said frame, each pallet having a first end, a second end, and a load conveying surface between said first end and said second end configured to carry luggage thereon;
a drive assembly coupled to said plurality of pallets to move said pallets relative to said frame; and
a plurality of bumpers, each bumper coupled to a corresponding one of said plurality of pallets at said second end of said pallet, wherein said plurality of bumpers are configured to overlap each other to provide a substantially continuous surface as said plurality of pallets move along said frame, said surface projecting upward from said load conveying surface to abut luggage.

12. The luggage conveyor system of claim 11, wherein said plurality of said bumpers are configured to overlap each other by a maximum of 3.774 inches.

13. A luggage conveyor system, comprising
a frame having a length including at least one linear section, at least one inside turn and at least one outside turn;
a plurality of overlapping pallets supported by said frame for conveying luggage, said plurality of overlapping pallets configured to provide a substantially continuous load carrying surface over said length of said frame, wherein said plurality of overlapping pallets are configured to deflect a maximum of 1.450 inches with respect to a relaxed position; and
a drive assembly configured to move at least one pallet of said plurality of pallets along said frame.

14. The luggage conveyor system of claim 13, further comprising a pallet beam coupled to each of said plurality of overlapping pallets.

15. The luggage conveyor system of claim 14, wherein each of said plurality of overlapping pallets cantilevers with respect to said pallet beam.

* * * * *